United States Patent Office.

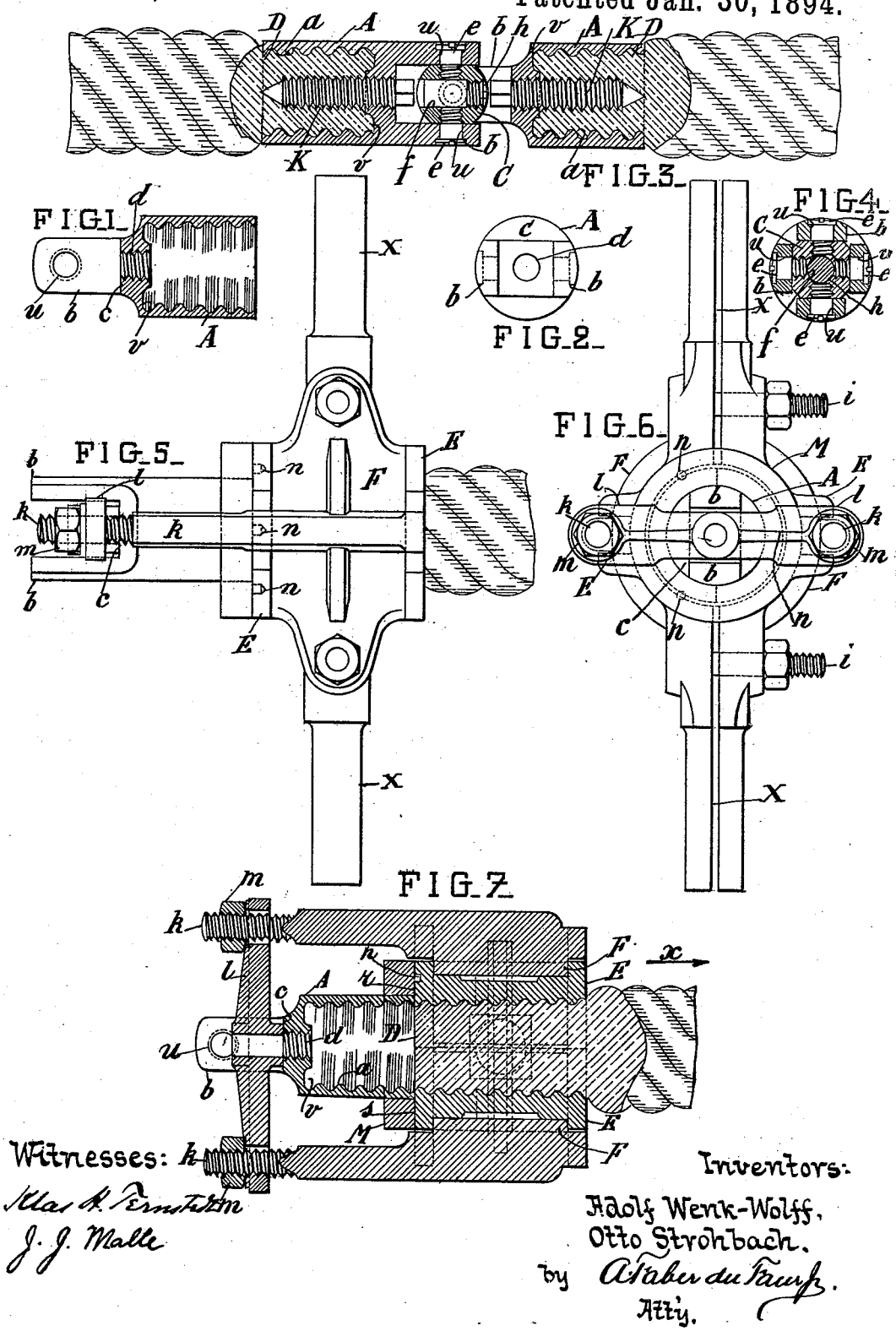

ADOLF WENK-WOLFF AND OTTO STROHBACH, OF MANNHEIM, GERMANY.

ROPE-COUPLING.

SPECIFICATION forming part of Letters Patent No. 513,746, dated January 30, 1894.

Application filed May 24, 1893. Serial No. 475,335. (No model.)

*To all whom it may concern:*

Be it known that we, ADOLF WENK-WOLFF, director of rope-making company, (late Ferdinand Wolff,) and OTTO STROHBACH, engineer, both of Mannheim, Baden, in the Empire of Germany, have invented an Improved Coupling for Ropes, of which the following is a full, clear, and exact description.

Our invention relates to a coupling for ropes for transmitting power and for other purposes which can be applied with the greatest ease and without special knowledge by any ordinary laborer, and removed with equal ease, so that when slackening or stretching of a rope, such as a rope for transmitting power, occurs, the shortening of the rope by cutting off one end may be easily and quickly effected. Our improved coupling for ropes consists essentially of two sockets, provided with round screw threads and connected by a universal joint, in which sockets the ends of the rope after being compressed are secured by having a taper pointed screw driven therein in the direction of the axis of the rope. As the result of this connection of the two coupling sockets by means of a universal joint, the greatest possible mobility of these parts is attained, and by the special method of fixing the ends of the rope in the coupling sockets it is rendered possible to connect the ends of the rope firmly with the coupling sockets without occasioning a weakening of the rope by cutting away a portion of its substance.

Our new coupling has further the advantage that it is of smaller diameter than the rope the ends of which it connects, so that in using the new coupling on ropes for transmitting power the coupling does not come into contact with the grooves of the pulley over which the rope runs, and in consequence causes no noise, even when passing over such a groove.

To enable our invention to be fully understood we will describe how it can be carried into practice by reference to the accompanying drawings, in which—

Figure 1. is a longitudinal section of one of the two coupling sockets and Fig. 2. is an end elevation of the same. Fig. 3. is a longitudinal section showing the coupling connected to the two ends of a rope and Fig. 4. is a cross section through the middle of the universal joint. Figs. 5, 6 and 7. are side and front elevations and a longitudinal section respectively of a screw stock which we use to secure the ends of the rope in the coupling sockets.

As shown in Fig. 3, our rope coupling consists of two sockets A, which are provided with internal coarse round threads $a$, and two lugs $b$, at their opposing ends which lugs serve to receive the bolts of the universal joint which connects the two sockets A. These lugs $b$, project beyond the end or face $c$, of the sockets A, and this end or face has a central opening $d$, furnished with a female thread, which is intended to receive the taper pointed screw K, which insures the fastening of the end of the rope in the socket. The four axes of rotation of the universal joint, of which one pair is at right angles to the other pair, are formed by four set screws $e$, which are screwed into the ball C the shoulders of which form the real axes of the joint. The heads of these shouldered screws $e$, are countersunk in the lugs $b$. To prevent any loosening of the screws $e$, from taking place, a hole $f$, is drilled vertically to the plane, in which the axes of these screws lie after having been inserted into the ball C in which a screw $h$ (which may have its shank partly smooth as in the drawings) is inserted, so that the screws $e$, can neither be turned nor turn of their own accord as long as the screw $h$ keeps its position in the hole $f$.

For securing the ends D of the rope in the sockets A the screw stock shown in Figs. 5, 6 and 7 is made use of. This latter consists of two plates or cheeks E provided with screw threads, which correspond to the thread $a$ in the socket A and two pressure cheeks F, held together by bolts $i$. The latter cheeks are provided with pins $k$ on the two screw threaded ends of which a cross bar $l$ is held by nuts $m$.

In order to insert a rope's end into one of the sockets A, the end of the rope is placed between the two screw cheeks E, and the latter are pressed together by means of the pressure cheeks F, the nuts of the bolts $i$, on the latter being tightened to such a degree that the diameter of the end of the rope is lessened by about one fifth and the thread on the cheeks E, impresses itself upon the circumference of the rope (Fig. 7). The end of the rope is now cut away at the level of the terminal surface r, s of the screw, as is shown in Fig. 7 and the socket A, after putting a loose disk M upon it, is brought into the position shown in Fig. 7, whereupon pins n, on the disk M engage in corresponding holes in the screw cheeks E and by screwing home the nuts m, the cross bar l presses against the bottom of the socket A, and thus drives the open end of the latter to the plane r, s. The screw stock is then turned by means of the arms X X so far that it advances upon the rope (which is suitably held in position) in the direction of the arrow x, so that the female screw a in the socket engages with the previously formed thread upon the rope and advances upon the latter until the end of the rope comes into contact with the inner face of the socket A. The screw stock is thereupon taken to pieces, removed from the rope and the fastening of the end of the rope in the socket A, completed by screwing in the taper pointed screw K, through the hole d in the end or outer face of the socket A, by the application of a suitable key which can be fitted upon the square end of the screw K. By driving in the screw K the rope which has already been considerably compressed, has its end D firmly clamped in the socket A, while the end of the rope is able to spread in the ring shaped groove v and completely fills the said space. After both the ends of the rope to be joined have thus been provided with a socket A, the two sockets are connected by inserting the joint pins into the holes u, and screwing them into the ball C and these pins e are then secured in position by the insertion of the screws h, as shown in Fig. 3.

This rope coupling is chiefly designed for hemp ropes and hemp cables, and has the following advantages as compared with all other rope couplings:—

First. It is thinner than the rope, so that when used on ropes for the transmission of power the grooves in the pulleys never come into contact with the metallic coupling, so that no noise is caused as the rope coupling passes over the pulleys.

Second. As the result of the action of the universal joint a free movement is allowed the two sockets with respect to each other; this is very essential for the transmission of power.

Third. The ends of the rope are firmly secured in the sockets without its being necessary to weaken the rope by cutting away a portion of the strands.

Fourth. It may be easily and quickly applied to and removed from the ends of ropes, so that a rope which has stretched may speedily be shortened by cutting off a portion from one end on the spot. Although this rope coupling is primarily intended for hempen ropes, it may also be employed for wire ropes or wire ropes coated with hemp.

Having thus fully described our invention, we claim as new and desire to secure by Letters Patent—

1. A rope coupling consisting of two sockets for the reception of the ends of the rope, provided respectively with opposite lugs, a ball between said opposite lugs, screw studs entering the lugs and ball, and a set screw entering the ball at right angles to the screw studs, substantially as described.

2. A rope coupling consisting of two sockets connected by a universal joint and having their bores of smaller diameter than the rope and provided with internal rounded screw threads, combined with taper pointed screws entering said sockets axially and extending into the rope, substantially as and for the purpose set forth.

3. A rope coupling consisting of two sockets having their bores of smaller diameter than the rope and provided with internal rounded screw threads and annular spaces at the terminals of the threads, taper pointed screws entering said sockets axially and extending into the ends of the compressed rope, a ball between said sockets, studs entering the balls from the sockets, and a set screw entering the ball at right angles to the studs, substantially as described.

In witness whereof we have hereunto signed our names in the presence of two subscribing witnesses.

ADOLF WENK-WOLFF.
OTTO STROHBACH.

Witnesses:
FRIEDRICH DIETZ,
MAX SCHMID.